US012282663B2

(12) United States Patent
Radhakrishnan et al.

(10) Patent No.: US 12,282,663 B2
(45) Date of Patent: Apr. 22, 2025

(54) DATA STORAGE DEVICE AND METHOD FOR TIME-POOLED HOT DATA RELOCATION

(71) Applicant: Western Digital Technologies, Inc., San Jose, CA (US)

(72) Inventors: Bharath Radhakrishnan, Georgetown (MY); Daniel J. Linnen, Naperville, IL (US)

(73) Assignee: Sandisk Technologies, Inc., Milpitas, CA (US)

( * ) Notice: Subject to any disclaimer, the term of this patent is extended or adjusted under 35 U.S.C. 154(b) by 0 days.

(21) Appl. No.: 18/227,466

(22) Filed: Jul. 28, 2023

(65) Prior Publication Data

US 2024/0419334 A1 Dec. 19, 2024

Related U.S. Application Data

(60) Provisional application No. 63/472,617, filed on Jun. 13, 2023.

(51) Int. Cl.
*G06F 3/06* (2006.01)
*G06F 11/07* (2006.01)

(52) U.S. Cl.
CPC .......... *G06F 3/0619* (2013.01); *G06F 3/0647* (2013.01); *G06F 3/0673* (2013.01); *G06F 11/076* (2013.01)

(58) Field of Classification Search
CPC .. G06F 3/0619; G06F 3/0647; G06F 3/03673; G06F 11/076
See application file for complete search history.

(56) References Cited

U.S. PATENT DOCUMENTS

| | | | |
|---|---|---|---|
| 10,353,616 B1* | 7/2019 | Tao | G06F 3/061 |
| 12,093,189 B1* | 9/2024 | Saidi | G06F 12/0868 |
| 2006/0218199 A1* | 9/2006 | Kishi | G06F 3/0619 |
| 2008/0092016 A1* | 4/2008 | Pawlowski | G06F 11/1076 |
| | | | 714/E11.041 |
| 2010/0281230 A1* | 11/2010 | Rabii | G06F 3/0605 |
| | | | 711/170 |
| 2012/0278535 A1* | 11/2012 | Yeh | G06F 12/0246 |
| | | | 711/E12.008 |
| 2017/0090763 A1* | 3/2017 | Horn | G06F 3/0676 |
| 2020/0143847 A1* | 5/2020 | Yuan | G11C 29/12 |
| 2023/0333761 A1* | 10/2023 | Choudhary | G06F 3/065 |

* cited by examiner

*Primary Examiner* — Aracelis Ruiz
(74) *Attorney, Agent, or Firm* — Crowell & Moring LLP

(57) ABSTRACT

Post-write data management operations, such as refresh read, data scrub, and data relocation, are typically performed after a certain period of time has elapsed. However, performing such operations based on probability of access can provide advantages. So, in one example, a post-write data management operation is performed more frequently on relatively-warmer data than on relatively-colder data.

19 Claims, 7 Drawing Sheets

DATA STORAGE DEVICE AND METHOD FOR TIME-POOLED HOT DATA RELOCATION

CROSS-REFERENCE TO RELATED APPLICATION

This application claims priority to U.S. provisional patent application No. 63/472,617, filed Jun. 13, 2023, which is hereby incorporated by reference.

BACKGROUND

A host can write data to and/or read data from a memory in a data storage device. Post-write data management operations, such as refresh, data scrub, and data relocation, can be performed to help ensure the reliability of the stored data. Such operations can be performed after a certain period of time has elapsed.

DETAILED DESCRIPTION

The following embodiments generally relate to a data storage device and method for time-pooled hot data relocation. In one embodiment, a data storage device is provided comprising a memory and a controller. The controller is configured to: identify data stored in the memory that has been accessed by a host more than a threshold number of times; identify data stored in the memory that has been not been accessed by the host more that the threshold number of times; and perform a post-write data management operation on the data that has been accessed by the host more than the threshold number of times more frequently than on the data that has been not been accessed by the host more that the threshold number of times.

In another embodiment, a method is provided that is performed in a data storage device comprising a memory. The method comprises: measuring a plurality of charge loss values in a portion of the memory; predicting a future charge loss based on the measured plurality of charge loss values; determining whether the predicted future charge loss is within a quality-of-service limit; and performing a post-write data management operation on data stored in the portion of the memory in response to determining that the predicted future charge loss is not within the quality-of-service limit.

In yet another embodiment, a data storage device is provided comprising: a memory; means for segregating data stored in the memory into relatively-warmer data and relatively-colder data; and means for performing a post-write data management operation on the relatively-warmer data at a higher rate than on the relatively-colder data.

Other embodiments are possible, and each of the embodiments can be used alone or together in combination. Accordingly, various embodiments will now be described with reference to the attached drawings.

EMBODIMENTS

The following embodiments relate to a data storage device (DSD). As used herein, a "data storage device" refers to a non-volatile device that stores data. Examples of DSDs include, but are not limited to, hard disk drives (HDDs), solid state drives (SSDs), tape drives, hybrid drives, etc. Details of example DSDs are provided below.

Figure 1A:
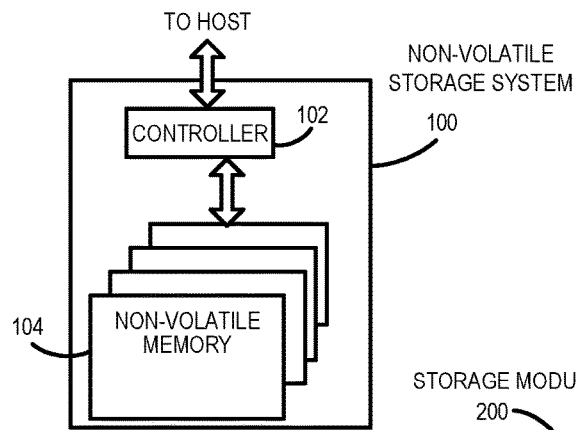
FIG. 1A is a block diagram of a data storage device of an embodiment.
Figure 1B:
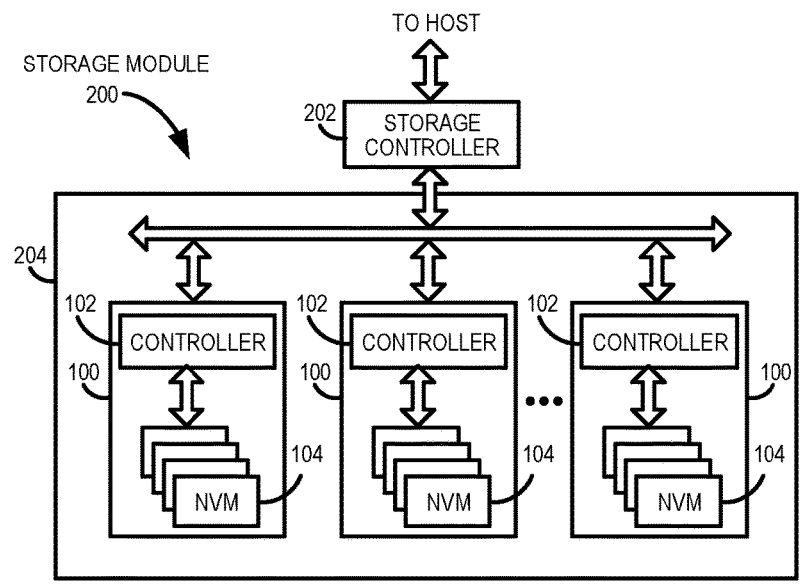
FIG. 1B is a block diagram illustrating a storage module of an embodiment.
Figure 1C:
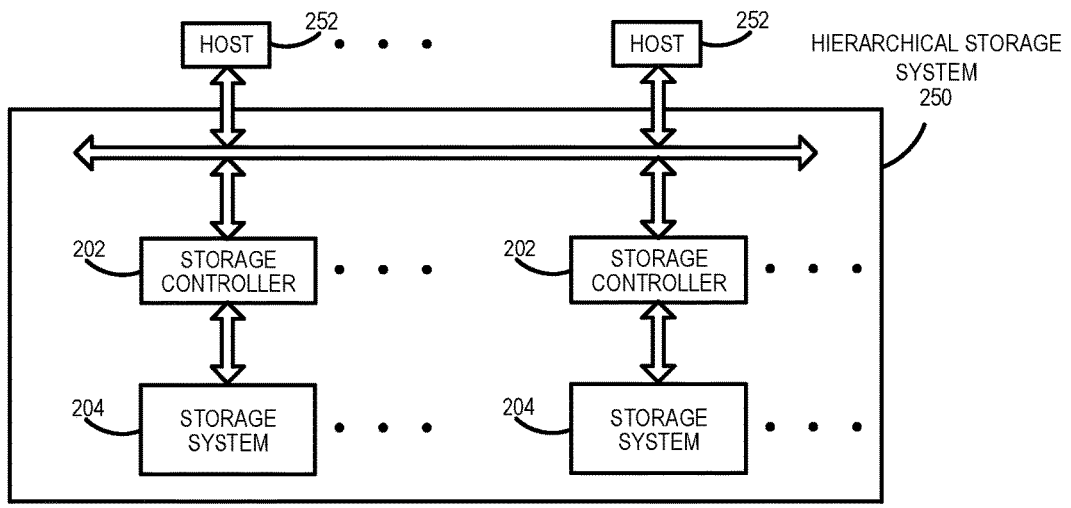
FIG. 1C is a block diagram illustrating a hierarchical storage system of an embodiment.

Data storage devices suitable for use in implementing aspects of these embodiments are shown in FIGS. 1A-1C. FIG. 1A is a block diagram illustrating a data storage device 100 according to an embodiment of the subject matter described herein. Referring to FIG. 1A, data storage device 100 includes a controller 102 and non-volatile memory that may be made up of one or more non-volatile memory die 104. As used herein, the term die refers to the collection of non-volatile memory cells, and associated circuitry for managing the physical operation of those non-volatile memory cells, that are formed on a single semiconductor substrate. Controller 102 interfaces with a host system and transmits command sequences for read, program, and erase operations to non-volatile memory die 104.

The controller 102 (which may be a non-volatile memory controller (e.g., a flash, resistive random-access memory (ReRAM), phase-change memory (PCM), or magnetoresistive random-access memory (MRAM) controller)) can take the form of processing circuitry, a microprocessor or processor, and a computer-readable medium that stores computer-readable program code (e.g., firmware) executable by the (micro) processor, logic gates, switches, an application specific integrated circuit (ASIC), a programmable logic controller, and an embedded microcontroller, for example. The controller 102 can be configured with hardware and/or firmware to perform the various functions described below and shown in the flow diagrams. Also, some of the components shown as being internal to the controller can also be stored external to the controller, and other components can be used. Additionally, the phrase "operatively in communication with" could mean directly in communication with or indirectly (wired or wireless) in communication with through one or more components, which may or may not be shown or described herein.

As used herein, a non-volatile memory controller is a device that manages data stored on non-volatile memory and communicates with a host, such as a computer or electronic device, with any suitable operating system. A non-volatile memory controller can have various functionality in addition to the specific functionality described herein. For example, the non-volatile memory controller can format the non-volatile memory to ensure the memory is operating properly, map out bad non-volatile memory cells, and allocate spare cells to be substituted for future failed cells. Some part of the spare cells can be used to hold firmware (and/or other metadata used for housekeeping and tracking) to operate the non-volatile memory controller and implement other features. In operation, when a host needs to read data from or write data to the non-volatile memory, it can communicate with the non-volatile memory controller. If the host provides a logical address to which data is to be read/written, the non-volatile memory controller can convert the logical address received from the host to a physical address in the non-volatile memory. The non-volatile memory controller can also perform various memory management functions, such as, but not limited to, wear leveling (distributing writes to avoid wearing out specific blocks of memory that would otherwise be repeatedly written to) and garbage collection (after a block is full, moving only the valid pages of data to a new block, so the full block can be erased and reused).

Non-volatile memory die 104 may include any suitable non-volatile storage medium, including resistive random-access memory (ReRAM), magnetoresistive random-access memory (MRAM), phase-change memory (PCM), NAND flash memory cells and/or NOR flash memory cells. The memory cells can take the form of solid-state (e.g., flash) memory cells and can be one-time programmable, few-time programmable, or many-time programmable. The memory cells can also be single-level cells (SLC), multiple-level cells (MLC) (e.g., dual-level cells, triple-level cells (TLC), quad-level cells (QLC), etc.) or use other memory cell level technologies, now known or later developed. Also, the memory cells can be fabricated in a two-dimensional or three-dimensional fashion.

The interface between controller 102 and non-volatile memory die 104 may be any suitable flash interface, such as Toggle Mode 200, 400, or 800. In one embodiment, the data storage device 100 may be a card based system, such as a secure digital (SD) or a micro secure digital (micro-SD) card. In an alternate embodiment, the data storage device 100 may be part of an embedded data storage device.

Although, in the example illustrated in FIG. 1A, the data storage device 100 (sometimes referred to herein as a storage module) includes a single channel between controller 102 and non-volatile memory die 104, the subject matter described herein is not limited to having a single memory channel. For example, in some architectures (such as the ones shown in FIGS. 1B and 1C), two, four, eight or more memory channels may exist between the controller and the memory device, depending on controller capabilities. In any of the embodiments described herein, more than a single channel may exist between the controller and the memory die, even if a single channel is shown in the drawings.

FIG. 1B illustrates a storage module 200 that includes plural non-volatile data storage devices 100. As such, storage module 200 may include a storage controller 202 that interfaces with a host and with data storage device 204, which includes a plurality of data storage devices 100. The interface between storage controller 202 and data storage devices 100 may be a bus interface, such as a serial advanced technology attachment (SATA), peripheral component interconnect express (PCIe) interface, double-data-rate (DDR) interface, or serial attached small scale compute interface (SAS/SCSI). Storage module 200, in one embodiment, may be a solid-state drive (SSD), or non-volatile dual in-line memory module (NVDIMM), such as found in server PC or portable computing devices, such as laptop computers, and tablet computers.

FIG. 1C is a block diagram illustrating a hierarchical storage system. A hierarchical storage system 250 includes a plurality of storage controllers 202, each of which controls a respective data storage device 204. Host systems 252 may access memories within the storage system 250 via a bus interface. In one embodiment, the bus interface may be a Non-Volatile Memory Express (NVMe) or Fibre Channel over Ethernet (FCoE) interface. In one embodiment, the system illustrated in FIG. 1C may be a rack mountable mass storage system that is accessible by multiple host computers, such as would be found in a data center or other location where mass storage is needed.

Figure 2A:
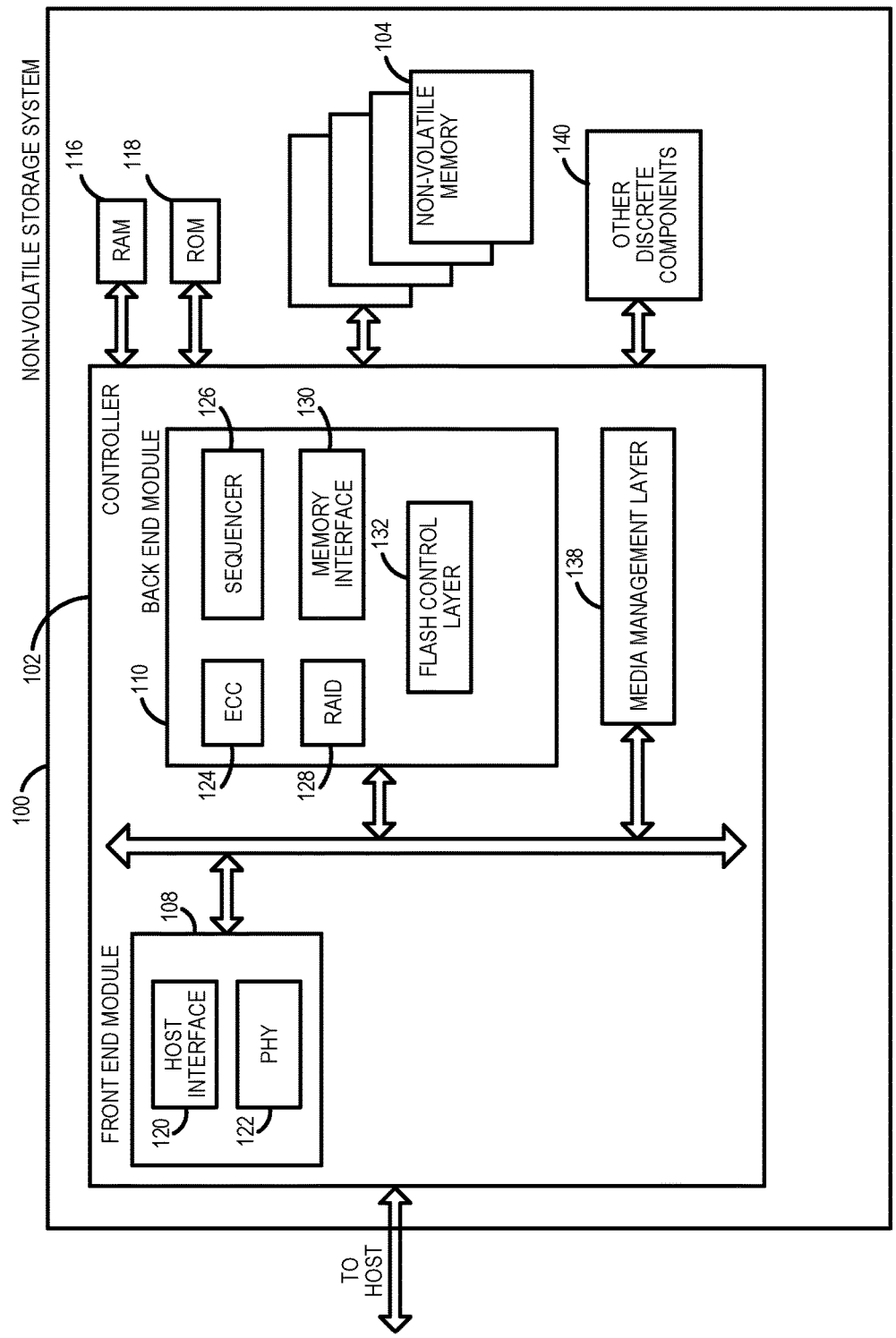
FIG. 2A is a block diagram illustrating components of the controller of the data storage device illustrated in FIG. 1A according to an embodiment.

FIG. 2A is a block diagram illustrating components of controller 102 in more detail. Controller 102 includes a front-end module 108 that interfaces with a host, a back-end module 110 that interfaces with the one or more non-volatile memory die 104, and various other modules that perform functions which will now be described in detail. A module may take the form of a packaged functional hardware unit designed for use with other components, a portion of a program code (e.g., software or firmware) executable by a (micro) processor or processing circuitry that usually performs a particular function of related functions, or a self-contained hardware or software component that interfaces with a larger system, for example. Also, "means" for performing a function can be implemented with at least any of the structure noted herein for the controller and can be pure hardware or a combination of hardware and computer-readable program code.

Referring again to modules of the controller 102, a buffer manager/bus controller 114 manages buffers in random access memory (RAM) 116 and controls the internal bus arbitration of controller 102. A read only memory (ROM) 118 stores system boot code. Although illustrated in FIG. 2A as located separately from the controller 102, in other embodiments one or both of the RAM 116 and ROM 118 may be located within the controller. In yet other embodiments, portions of RAM and ROM may be located both within the controller 102 and outside the controller.

Front-end module 108 includes a host interface 120 and a physical layer interface (PHY) 122 that provide the electrical interface with the host or next level storage controller. The choice of the type of host interface 120 can depend on the type of memory being used. Examples of host interfaces 120 include, but are not limited to, SATA, SATA Express, serially attached small computer system interface (SAS), Fibre Channel, universal serial bus (USB), PCIe, and NVMe. The host interface 120 typically facilitates transfer for data, control signals, and timing signals.

Back-end module 110 includes an error correction code (ECC) engine 124 that encodes the data bytes received from the host, and decodes and error corrects the data bytes read from the non-volatile memory. A command sequencer 126 generates command sequences, such as program and erase command sequences, to be transmitted to non-volatile memory die 104. A RAID (Redundant Array of Independent Drives) module 128 manages generation of RAID parity and recovery of failed data. The RAID parity may be used as an additional level of integrity protection for the data being written into the memory device 104. In some cases, the RAID module 128 may be a part of the ECC engine 124. A memory interface 130 provides the command sequences to non-volatile memory die 104 and receives status information from non-volatile memory die 104. In one embodiment, memory interface 130 may be a double data rate (DDR) interface, such as a Toggle Mode 200, 400, or 800 interface. A flash control layer 132 controls the overall operation of back-end module 110.

The data storage device 100 also includes other discrete components 140, such as external electrical interfaces, external RAM, resistors, capacitors, or other components that may interface with controller 102. In alternative embodiments, one or more of the physical layer interface 122, RAID module 128, media management layer 138 and buffer management/bus controller 114 are optional components that are not necessary in the controller 102.

Figure 2B:
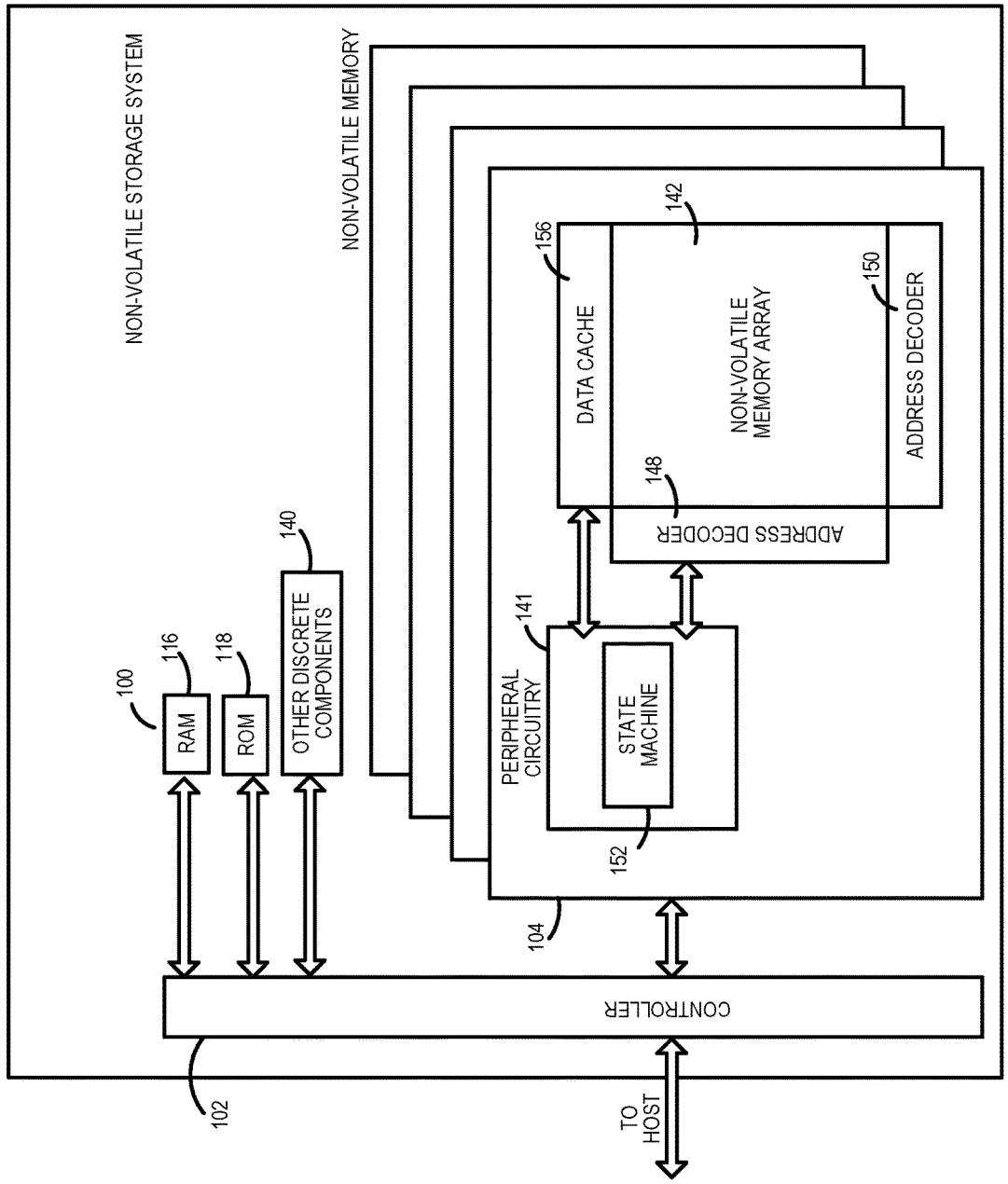
FIG. 2B is a block diagram illustrating components of the memory data storage device illustrated in FIG. 1A according to an embodiment.

FIG. 2B is a block diagram illustrating components of non-volatile memory die 104 in more detail. Non-volatile memory die 104 includes peripheral circuitry 141 and non-volatile memory array 142. Non-volatile memory array 142 includes the non-volatile memory cells used to store data. The non-volatile memory cells may be any suitable non-volatile memory cells, including ReRAM, MRAM, PCM, NAND flash memory cells and/or NOR flash memory cells in a two-dimensional and/or three-dimensional configuration. Non-volatile memory die 104 further includes a data cache 156 that caches data. Peripheral circuitry 141 includes a state machine 152 that provides status information to the controller 102.

Returning again to FIG. 2A, the flash control layer 132 (which will be referred to herein as the flash translation layer (FTL) handles flash errors and interfaces with the host. In particular, the FTL, which may be an algorithm in firmware, is responsible for the internals of memory management and translates writes from the host into writes to the memory 104. The FTL may be needed because the memory 104 may have limited endurance, may be written in only multiples of pages, and/or may not be written unless it is erased as a block. The FTL understands these potential limitations of the memory 104, which may not be visible to the host. Accordingly, the FTL attempts to translate the writes from host into writes into the memory 104.

The FTL may include a logical-to-physical address (L2P) map (sometimes referred to herein as a table or data structure) and allotted cache memory. In this way, the FTL translates logical block addresses ("LBAs") from the host to physical addresses in the memory 104. The FTL can include other features, such as, but not limited to, power-off recovery (so that the data structures of the FTL can be recovered in the event of a sudden power loss) and wear leveling (so that the wear across memory blocks is even to prevent certain blocks from excessive wear, which would result in a greater chance of failure).

Figure 3:
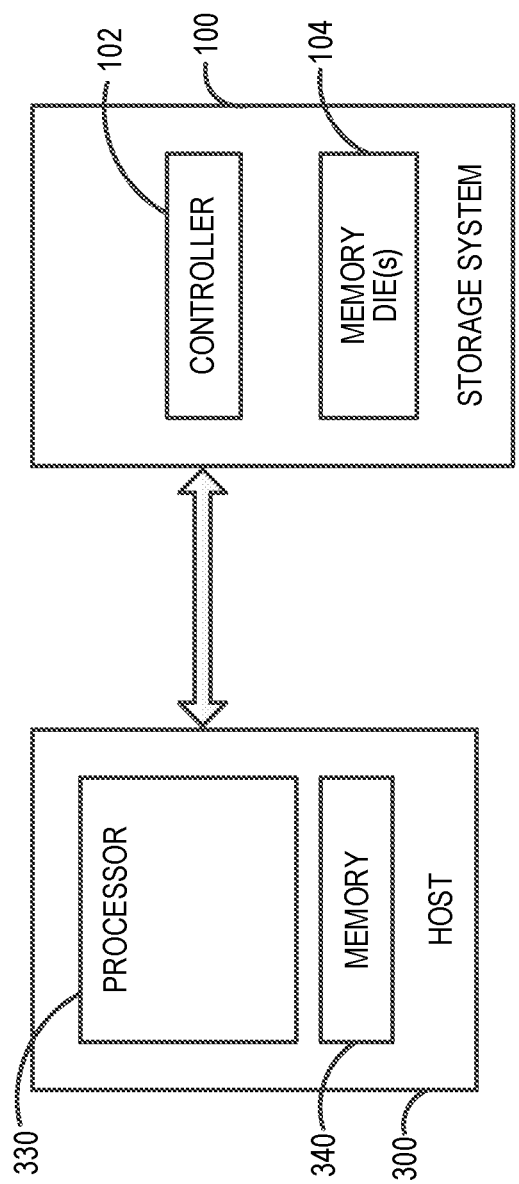
FIG. 3 is a block diagram of a host and a data storage device of an embodiment.

Turning again to the drawings, FIG. 3 is a block diagram of a host 300 and data storage device 100 of an embodiment. The host 300 can take any suitable form, including, but not limited to, a computer, a mobile phone, a tablet, a wearable device, a digital video recorder, a surveillance system, etc. The host 300 in this embodiment (here, a computing device) comprises a processor 330 and a memory 340. In one embodiment, computer-readable program code stored in the host memory 340 configures the host processor 330 to perform the acts described herein. So, actions performed by the host 300 are sometimes referred to herein as being performed by an application (computer-readable program code) run on the host 300. For example, the host 300 can be configured to send data (e.g., initially stored in the host's memory 340) to the data storage device 100 for storage in the data storage device's memory 104.

As mentioned above, in NAND-based data storage devices, there can be some blocks that have data that was recently accessed by the host and some blocks that have data that has not been recently accessed by the host. Post-write data management operations, such as block/data refresh, read scrub, and/or data relocation, are typically based on time and not on the probability of access. When quality of service (QOS) metrics treat data that is likely to be accessed by the host in the same manner as data that is not likely to be accessed by the host, there can be an opportunity for optimization. These embodiments can be used to address this opportunity by segregating hot and cold data and then reducing post-write data management operation rates on blocks that are not likely to be read (blocks that store cold data). Cold data can be allowed to get colder, and algorithms can manage that process by taking into account the likelihood of access by the host. This process will sometimes be referred to herein as a time-pooled hot data relocation process across data storage devices to increase data retentivity and extend life of the data storage devices.

Figure 4:
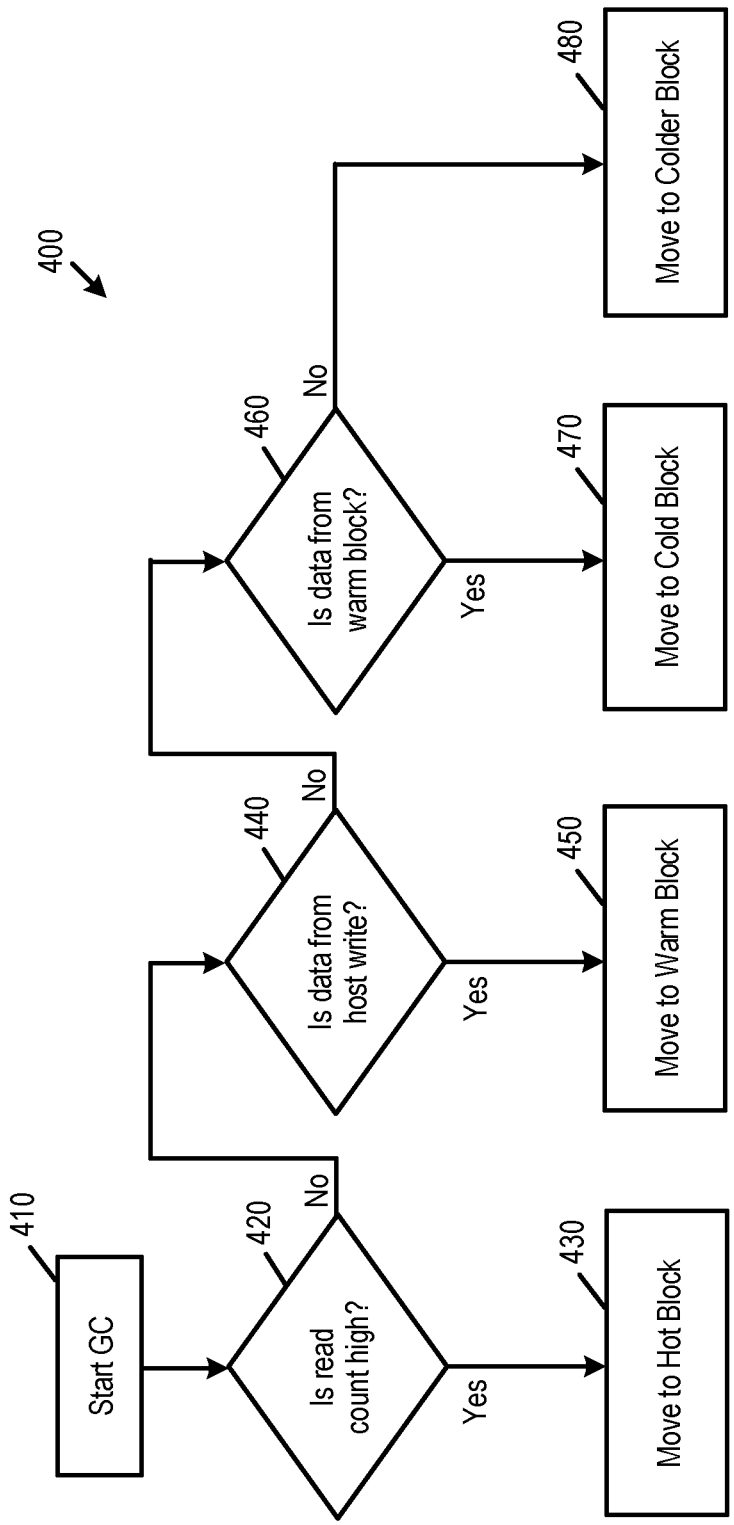
FIG. 4 is a flow chart of a method of an embodiment depicting a flow of cold data getting colder.

Turning again to the drawings, FIG. 4 is a flow chart 400 of an embodiment depicting a flow of cold data getting colder. As shown in FIG. 4, at the start of a garbage collection operation, the controller 102 of the data storage device 100 determines if the read count is above a threshold (act 420). If the read count is above the threshold (i.e., the read count is high), the controller 102 moves the data to a hot block (i.e., a block that stores data that is very likely to be accessed within a relatively-short time period) (act 430). If the read count is below the threshold (i.e., the read count is low), the controller 102 determines if the data is from a host write (act 440). If the data is from a host write, the controller 102 moves the data to a warm block (i.e., a block that stores data that is likely to be accessed within a relatively-short time period) (act 450). If the data is not from a host write, the controller 102 determine if the data is from a warm block (act 460). If the data is from a warm block, the controller 102 moves the data to a cold block (i.e., a block that stores data that is not likely to be accessed within a relatively-short time period) (act 470). If the data is not from a warm block, the controller 102 moves the data to a colder block (i.e., a block that stores data that is not very likely to be accessed within a relatively-short time period) (act 480).

The method shown in FIG. 4 can enable data to cool down, but it may be possible to better enable this or to enable this faster by pulling data out of the cold blocks when the host 300 reads the data as a write-on-read action, so that if there was data that was read by the host 300, it can be rewritten into a hot block, thus separating it from the cold data flow. "Medium" read counts can be used, such that cold data does not immediately go to a hot block but rather goes into a warm block if the host 300 reads it. Also, read counts can be done on a smaller granularity than blocks, enabling better movement of hot data to hotter blocks and cold data to colder blocks. Further, data can be written to a single-level cell (SLC) block on read from a cold block, and some prefetching or expansion to sequentially-written data around a logical block address (LBA) can be used to keep quality of service high and get hot data out of a cold block when it heats up. Additionally, read counts from any data relocated by such a process can be set aside when garbage collection happens, as the other data would not have been read by those.

In another embodiment, category-based protection is used. For example, in the case of data refresh, block refreshes might normally happen every one week for QoS purposes, but in the case of cold blocks, this refresh might happen on the order of every 1.5 weeks, allowing for more bits to become in error but not enough for a failure. Read scrub can check data every two days, but on cold blocks, read scrub checks on the data can occur every three days.

Also, it is possible that data can become "too cold" (e.g., when data is lost because of exclusive-or (XOR) failures). Requiring XOR to recover data can possibly count as too cold, as it would be close to data being lost. However, if only one die was experiencing significant charge loss or only one die in a stripe/super block was experiencing significant charge loss, it may be acceptable to let XOR recover the data. Data that would not survive a data retention bake would be problematic, but data retention bakes are typically rare, and the survivability of the data will vary based on cycling. If the blocks are uncycled or largely uncycled, then they would very likely perform well in a data retention bake; however, if they are at end of life, they will likely not perform well.

Information can be used for data retention to avoid this "too cold" problem. For example, a very cold block can likely be a lot younger than the rest of the blocks in the memory 104. For example, such a block may have data that was sourced from a previous drive being cloned to a new, faster, larger drive, and the cycles on the data would be minimal. A very cold block can likely have data that was written a long time ago, as the point is to let it get colder. The rate of bit error growth and the curve associated with the bit error growth can be relevant. They can be derived by looking at a trajectory of bit errors rather than looking at a threshold and determining that the BER is too high. This curve can enable a projection of how long the block should live prior to a refresh. Further, this information can be a tradeoff between write amplification caused by user data being written many times over, and the drive storing information on how the block is performing.

Regarding what information to use, the worst page and the BER of the worst page at start and at every scan can be used. The worst sector and sampling sectors can also be done (as the bits are distributed across the page physically, a single sector on the page can represent the page well from a sense of BER due to data retention). The BER can be recorded on devices with enhanced post-write read (EPWR) simply by writing down the information that is there in the check after the read. When performing read scrubbing, there can be BER values noted for the read, such as the worst page observed and the BER observed. The total BER for the block or the total BER of the scanned portion of the block can also be noted.

Once these pieces of information are noted, they can be fit to some basic curves, such as exponential, linear, logarithmic, etc. It can also be known for each kind of media what curves would make sense for BER growth, and so the number of curves can be further limited. With this in mind, one could then project how long the block had before it would get to be too cold. This projection can be done with factoring in data retention. If, for example, a projection was that the block would have 18 months before the BER was too high and the JEDEC data retention time is one year, then the data could be refreshed in six months. The data can be checked periodically over the next six months to keep tabs on the projection. The rate of checking can be able to get larger and larger as the curve continues to project in a favorable manner, being on target or suggesting a longer timeline for data survival. For example, with six months of life left, the controller 102 can scan the block again after two weeks. If on target, the controller 102 can then next scan it after four weeks and then after eight weeks. Then, at the six-month point, the controller 102 can relocate the data. (The length between scans can saturate out, not allowing it to go longer than four or eight weeks, for example, to be conservative.). Blocks can be tracked on sub block units as well.

Because not all NAND blocks/dice are the same and not all cycle counts are the same, it is possible that projected curves may change over the life of the part. Charge loss is often driven by de-trapping or trap-assisted tunneling, which typically requires cycling to see significant effect. Depending on the quality of the material (specifically, the dielectric films surrounding the NAND cells and the quality of charge trap layers), it may be possible that some cells or some NAND vary significantly. Trap-up is influenced by cycling rate and cycling temperature, as this affects de-trapping. For these reasons, it may be best to do a few calculations for curve fitting and see which has the lowest R-squared value and assume that is the trend. Such trends can be done on a die-cycle-group basis or on a per-block basis. (Calculations can be relatively rare, on the order of weeks, and may not be computationally intensive.)

Additionally, correction time for a default read can track with BER. There may be a default timeout on error correction, but it can be possible to extend this significantly as the data is being read out. Depth into table or read voltage adjustments may be needed for correction in the case of levels being shifted to compensate for data being uncorrectable at a default read (or taking longer than expected). Also, regarding the time to correct in soft-bit decoding (using the soft-bit information), it is possible that the data can be corrected especially with a longer timeout. The time to refresh the data can be determined by the time needed for these kinds of operations. Also, the distance between states can be used. One way to determine this is to determine the top of a particular state by finding the level where X % of the bits are in error and to do the same for the bottom of the state above it and then take the delta between them. Knowing the distance between the two top states (and possibly the two bottom states) can be used as a good indicator for how the cells are doing. Looking at this over time will give a sense of the rate of charge loss and help to project when the states have gotten too close. The value of "X" can likely be in the single digits and can be a factor of the error correction code (ECC) capability of the device.

A cold block data check after boot can occur. A quick verification done on some cold block locations, such as the ones that were already in the worst shape, can indicate that entire blocks are still good. It may be preferred to check cold blocks first, as they are the closest to falling into uncorrectable territory. As cold blocks are being monitored carefully and their data retention times are being projected, checking them first can give insights into the normal blocks and their need for refreshing.

Partial relocation can be used. As cold blocks will likely have some wordlines or pages that are limiting, it is possible that only a few pages per block may be relocated from the block if a problem is detected with too much data retention. Data retention is deliberately being pushed to the boundaries of what is acceptable, so it would have no bearing on future use or for triggering near-miss criteria. Also, as the goal is to reduce write amplification and to minimize background overhead, relocating some of the worst pages will likely buy a lot more time for the rest of the data. In schemes where there is partial relocation, it may be preferred to track the worst several pages or to break down sub-block tracking into "good pages" (or "typically good pages") and "bad pages" (or "typically bad pages") for easier tracking/projection of time needed until refresh.

Further, in systems that have RAID4/RAID5 protection, that projection can be a factor of the worst two locations within a stripe (three in the case of RAID6). With this kind of correction, the system can pay attention to the two worst locations, and when both of them fall into the possibility of exceeding a power-off data retention limit, and thus failing, would the system relocate the data.

Additionally, tiered access probability can be used. It is possible that different types of cold blocks can have different access demands. If this were the case, different quality of service tiers can be assigned to the different tiers of cold blocks, with the warmest of cold blocks falling into the category of being only slightly above typical quality of service, with colder blocks falling into the category of system operation timeout, and the coldest of cold blocks falling into the category of passing on a subsequent retry (with the data being recovered in anticipation of the retry happening).

Figure 5:
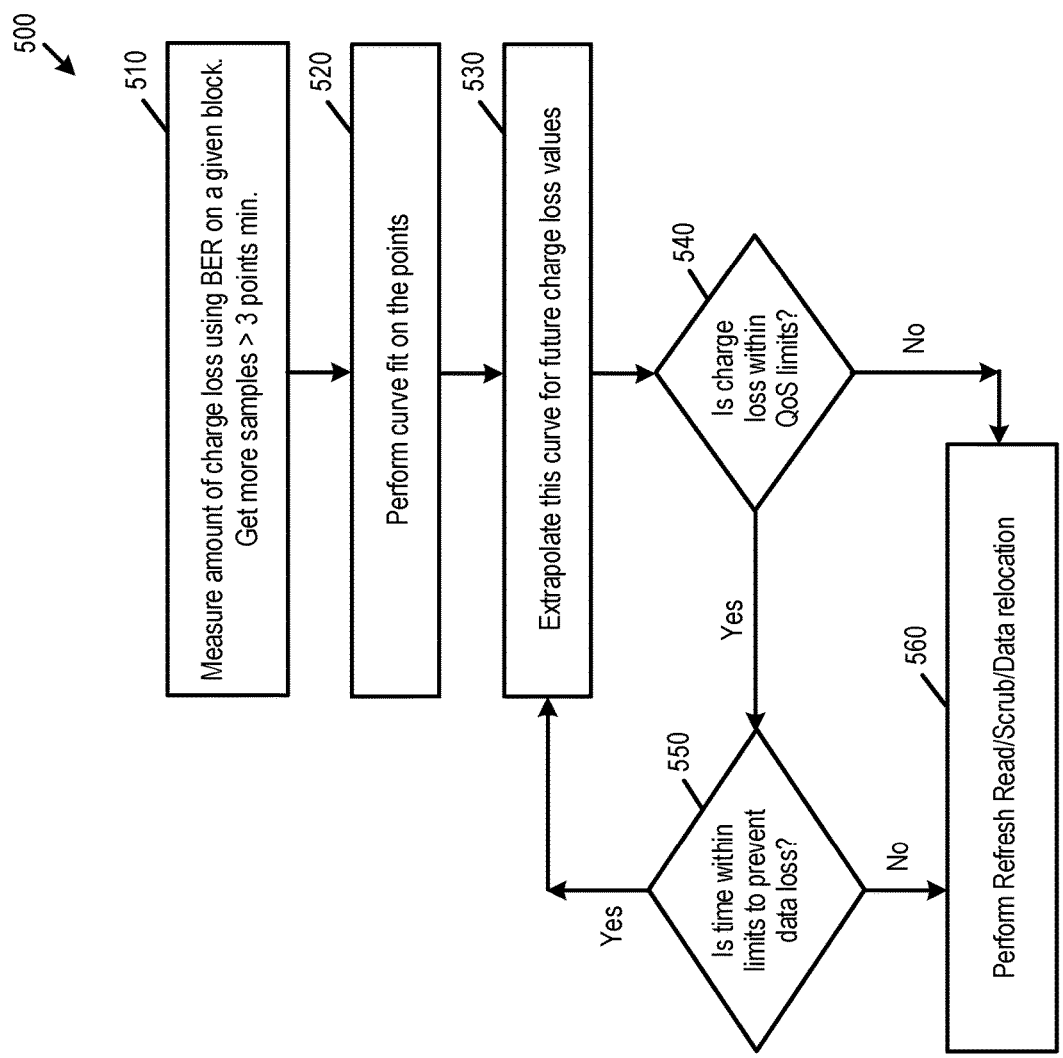
FIG. 5 is a flow chart of a method of an embodiment for performing a refresh read/scrub/data relocation operation.

Turning again to the drawings, FIG. 5 is a flow chart 500 of an embodiment for performing a refresh read/scrub/data relocation operation. As shown in FIG. 5, the controller 102 of the data storage device 100 measures the amount of charge lost using a bit error rate (BER) on a given block (act 510). In one example, a minimum of three samples are obtained. Next, the controller 102 performs a curve fit on the points (act 520) and extrapolates the curve for future charge lost values (act 530). The controller 102 then determines whether the charge loss is within the quality of service limits (act 540). If the charge loss is within the quality of service limits, the controller 102 determines whether the time is within a limit to prevent data loss (act 550). If it is, the method loops back to act 530. If it is not, the controller 102 performs a post-write data management operation, such as, for example, a refresh read, a data scrub, and/or data relocation operation (act 560). A post-write data management operation is also performed if the controller 102 determines, at act 540, that the charge loss is not within the quality of service limits.

Figure 6:
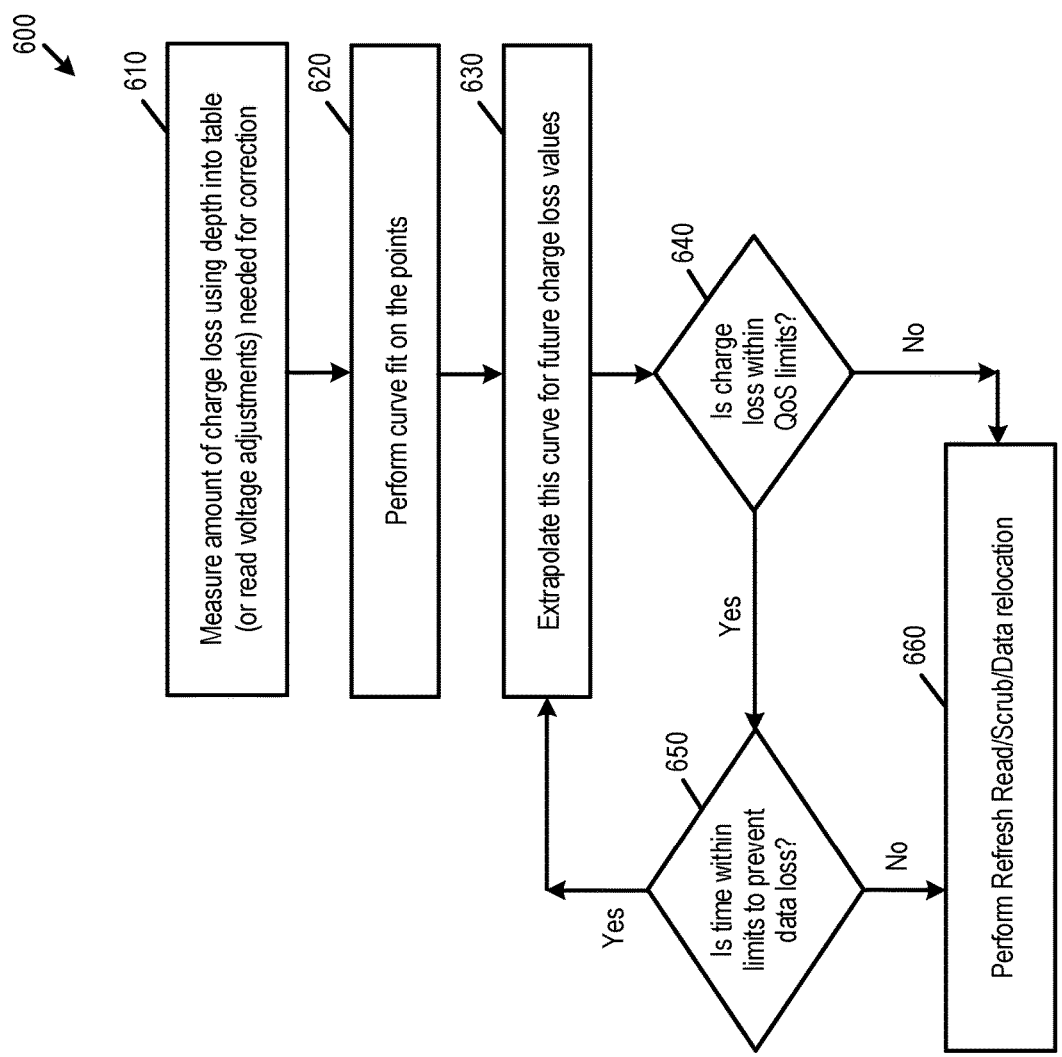
FIG. 6 is a flow chart of a method of an embodiment for performing a refresh read/scrub/data relocation operation.

FIG. 6 is a flow chart 600 of a variation of the method shown in FIG. 5. As shown in FIG. 6, the method starts with the controller 102 of the data storage device 100 measuring an amount of charge lost using depth into table (or read voltage adjustment) needed for correction (act 610). The other acts (acts 620-660) are similar to those acts 520-560 in FIG. 5.

There are several advantages associated with these embodiments. For example, treating all locations as being equally likely to be accessed by the host can cause greater write amplification by refreshing locations/data more often. These embodiments can avoid that. Also, bandwidth for read scrubbing is limited, so if a data storage device can focus it on the locations where the host is most likely to request data from, less bandwidth would be needed. Further, by reducing the amount of backend activity, these embodiments can reduce power consumption. Additionally, the amount of charge loss that is required to prompt failure versus the amount of charge loss that will require recalibration of read levels and additional read recovery methods is typically large. So, if the algorithm is setup for reads happening in one shot at a default read condition without soft-bit information, then that can be applied only to locations that are likely to be read, whereas the other locations that are unlikely to be read can be allowed to continue to lose charge and require additional reads and/or decoding/recovery methods with minimal impact to overall quality of service. In locations that are known to be allowed to lose charge, the controller 102 in the data storage device 100 can start out reading the data at a lower level to reduce the number of read retries and read recovery attempts.

Finally, as mentioned above, any suitable type of memory can be used. Semiconductor memory devices include volatile memory devices, such as dynamic random access memory ("DRAM") or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and magnetoresistive random access memory ("MRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are examples, and memory elements may be otherwise configured.

The semiconductor memory elements located within and/or over a substrate may be arranged in two or three dimensions, such as a two-dimensional memory structure or a three-dimensional memory structure.

In a two-dimensional memory structure, the semiconductor memory elements are arranged in a single plane or a single memory device level. Typically, in a two-dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and wordlines.

A three-dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate).

As a non-limiting example, a three-dimensional memory structure may be vertically arranged as a stack of multiple two dimensional memory device levels. As another non-limiting example, a three dimensional memory array may be arranged as multiple vertical columns (e.g., columns extending substantially perpendicular to the major surface of the substrate, i.e., in the y direction) with each column having multiple memory elements in each column. The columns may be arranged in a two dimensional configuration, e.g., in an x-z plane, resulting in a three dimensional arrangement of memory elements with elements on multiple vertically stacked memory planes. Other configurations of memory elements in three dimensions can also constitute a three dimensional memory array.

By way of non-limiting example, in a three dimensional NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other three dimensional configurations can be envisioned wherein some NAND strings contain memory elements in a single memory level while other strings contain memory elements which span through multiple memory levels. Three dimensional memory arrays may also be designed in a NOR configuration and in a ReRAM configuration.

Typically, in a monolithic three dimensional memory array, one or more memory device levels are formed above a single substrate. Optionally, the monolithic three dimensional memory array may also have one or more memory layers at least partially within the single substrate. As a non-limiting example, the substrate may include a semiconductor such as silicon. In a monolithic three dimensional array, the layers constituting each memory device level of the array are typically formed on the layers of the underlying memory device levels of the array. However, layers of adjacent memory device levels of a monolithic three dimensional memory array may be shared or have intervening layers between memory device levels.

Then again, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three dimensional memory arrays. Further, multiple two dimensional memory arrays or three dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

One of skill in the art will recognize that this invention is not limited to the two dimensional and three-dimensional structures described but cover all relevant memory structures within the spirit and scope of the invention as described herein and as understood by one of skill in the art.

It is intended that the foregoing detailed description be understood as an illustration of selected forms that the invention can take and not as a definition of the invention. It is only the following claims, including all equivalents, that are intended to define the scope of the claimed invention. Finally, it should be noted that any aspect of any of the embodiments described herein can be used alone or in combination with one another.

What is claimed is:

1. A data storage device comprising:
   a memory; and
   a processor coupled with the memory and configured to perform as part of a garbage collection operation:
   determine whether data stored in a source block in the memory has been read by a host more than a threshold number of times;
   in response to determining that the data has been read by the host more than the threshold number of times, move the data to a first destination block;
   in response to determining that the data has not been read by the host more than the threshold number of times, determine whether the data is from a host write;
   in response to determining that the data is from the host write, move the data to a second destination block, wherein the second destination block is less likely to be accessed within a time period than the first destination block;
   in response to determining that the data is not from a host write, determine whether the data is from a warm block;
   in response to determining that the data is from a warm block, move the data to a third destination block, wherein the third destination block is less likely to be accessed within the time period than the second destination block; and
   in response to determining that the data is not from a warm block, move the data to a fourth destination block, wherein the fourth destination block is less likely to be accessed within the time period than the third destination block.

2. The data storage device of claim 1, wherein the processor is further configured to perform a post-write data management operation on the data in response to a determination that that data is at risk of being lost.

3. The data storage device of claim 2, wherein the post-write data management operation comprises a refresh read operation.

4. The data storage device of claim 2, wherein the post-write data management operation comprises a read scrub operation.

5. The data storage device of claim 2, wherein the post-write data management operation comprises a data relocation operation.

6. The data storage device of claim 2, wherein the determination that the data is at risk of being lost is made when the data has been stored longer than a threshold amount of time in the memory.

7. The data storage device of claim 2, wherein the determination that the data is at risk of being lost is done when the data storage device boots up.

8. The data storage device of claim 2, wherein the data at risk of being lost is stored in a block and the post-write data management operation is only performed on a part of the block that stores the data at risk of being lost.

9. The data storage device of claim 1, wherein the memory comprises a three-dimensional memory array.

10. A data storage device comprising:
a memory; and
means for performing as part of a garbage collection operation:
- determining whether data stored in a source block in the memory has been read by a host more than a threshold number of times;
- in response to determining that the data has been read by the host more than the threshold number of times, moving the data to a first destination block;
- in response to determining that the data has not been read by the host more than the threshold number of times, determining whether the data is from a host write;
- in response to determining that the data is from the host write, moving the data to a second destination block, wherein the second destination block is less likely to be accessed within a time period than the first destination block;
- in response to determining that the data is not from a host write, determining whether the data is from a warm block;
- in response to determining that the data is from a warm block, moving the data to a third destination block, wherein the third destination block is less likely to be accessed within the time period than the second destination block; and
- in response to determining that the data is not from a warm block, moving the data to a fourth destination block, wherein the fourth destination block is less likely to be accessed within the time period than the third destination block.

11. In a data storage device comprising a memory, a method comprising:
performing as part of a garbage collection operation:
- determining whether data stored in a source block in the memory has been read by a host more than a threshold number of times;
- in response to determining that the data has been read by the host more than the threshold number of times, moving the data to a first destination block;
- in response to determining that the data has not been read by the host more than the threshold number of times, determining whether the data is from a host write;
- in response to determining that the data is from the host write, moving the data to a second destination block, wherein the second destination block is less likely to be accessed within a time period than the first destination block;
- in response to determining that the data is not from a host write, determining whether the data is from a warm block;
- in response to determining that the data is from a warm block, moving the data to a third destination block, wherein the third destination block is less likely to be accessed within the time period than the second destination block; and
- in response to determining that the data is not from a warm block, moving the data to a fourth destination block, wherein the fourth destination block is less likely to be accessed within the time period than the third destination block.

12. The method of claim 11, further comprising performing a post-write data management operation on the data in response to a determination that that data is at risk of being lost.

13. The method of claim 12, wherein the post-write data management operation comprises a refresh read operation.

14. The method of claim 12, wherein the post-write data management operation comprises a read scrub operation.

15. The method of claim 12, wherein the post-write data management operation comprises a data relocation operation.

16. The method of claim 12, wherein the determination that the data is at risk of being lost is made when the data has been stored longer than a threshold amount of time in the memory.

17. The method of claim 12, wherein the determination that the data is at risk of being lost is done when the data storage device boots up.

18. The method of claim 12, wherein the data at risk of being lost is stored in a block and the post-write data management operation is only performed on a part of the block that stores the data at risk of being lost.

19. The method of claim 11, wherein the memory comprises a three-dimensional memory array.

* * * * *